(12) United States Patent
Horng

(10) Patent No.: US 7,257,863 B2
(45) Date of Patent: Aug. 21, 2007

(54) HINGE DEVICE

(76) Inventor: Chin-Hsing Horng, No. 2, Alley 8, Lane 2, Sec. 1, Minsheng N. Rd., Kueishan Hsiang, Taoyuan County (TW)

( * ) Notice: Subject to any disclaimer, the term of this patent is extended or adjusted under 35 U.S.C. 154(b) by 173 days.

(21) Appl. No.: 11/134,770

(22) Filed: May 23, 2005

(65) Prior Publication Data

US 2006/0101616 A1 May 18, 2006

(51) Int. Cl.
*E05D 11/08* (2006.01)
*E05D 7/00* (2006.01)

(52) U.S. Cl. ...................................... 16/342
(58) Field of Classification Search .................. 16/341, 16/342, 328–330, 337–339, 273, 277, 352, 16/353, 278, 332; 403/78, 79, 119–120; 248/920, 922; 361/681, 683, 803; 379/433.13
See application file for complete search history.

(56) References Cited

U.S. PATENT DOCUMENTS

| | | | | | |
|---|---|---|---|---|---|
| 3,910,627 | A * | 10/1975 | Meyer | ...................... | 296/97.12 |
| 5,896,622 | A * | 4/1999 | Lu | ............................... | 16/342 |
| 5,950,281 | A * | 9/1999 | Lu | ............................... | 16/342 |
| 6,101,676 | A * | 8/2000 | Wahl et al. | ..................... | 16/342 |
| 6,170,120 | B1 * | 1/2001 | Lu | ............................... | 16/342 |
| 6,230,365 | B1 * | 5/2001 | Lu | ............................... | 16/342 |
| 6,378,171 | B1 * | 4/2002 | Suzuki et al. | .................. | 16/342 |
| 6,609,273 | B1 * | 8/2003 | Yamada et al. | ................ | 16/332 |
| 6,813,812 | B2 * | 11/2004 | Lu et al. | ........................ | 16/342 |
| 6,871,383 | B2 * | 3/2005 | Huang | ........................ | 16/295 |
| 7,003,852 | B2 * | 2/2006 | Wen-Pin | ....................... | 16/342 |
| 2002/0144378 | A1 * | 10/2002 | Liao | ............................ | 16/342 |
| 2003/0000046 | A1 * | 1/2003 | Liao | ............................ | 16/307 |
| 2003/0126719 | A1 * | 7/2003 | Chen | ........................... | 16/342 |
| 2005/0034274 | A1 * | 2/2005 | Wu | ............................... | 16/342 |

FOREIGN PATENT DOCUMENTS

JP 05086766 A * 4/1993

* cited by examiner

*Primary Examiner*—Robert J. Sandy

(57) ABSTRACT

The hinge device comprises a rotating shaft, a cylinder and a liner tube. The cylinder contains a cylindrical body having a passage therein, a fixing member and a positioning groove. The liner tube includes at least two pieces of liner portion with a hole therein, or it includes a liner member having a hole therethrough. A positioning flange is projected on the end of the liner tube so as to engage with the positioning groove. At both sides of the liner tube are formed curved portions respectively. While a shaft portion of the rotating shaft is pivotally inserted into the hole, between the curved portion and the cylindrical body is left some space for expansion; therefore, as the rotating shaft turns clockwise or counterclockwise, the rotation of the present invention is made smoothly which further results in hard wear and durability.

1 Claim, 4 Drawing Sheets

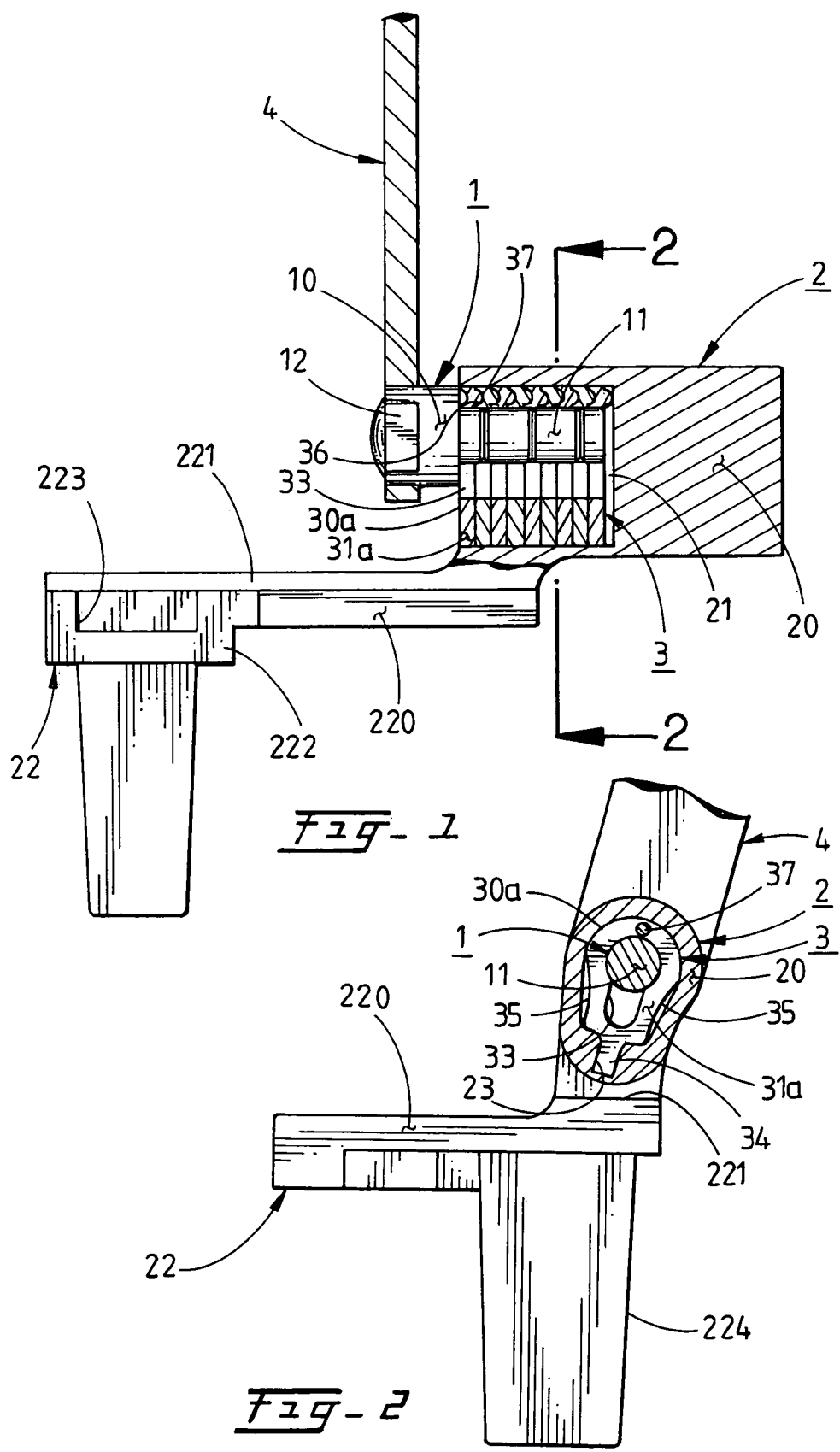

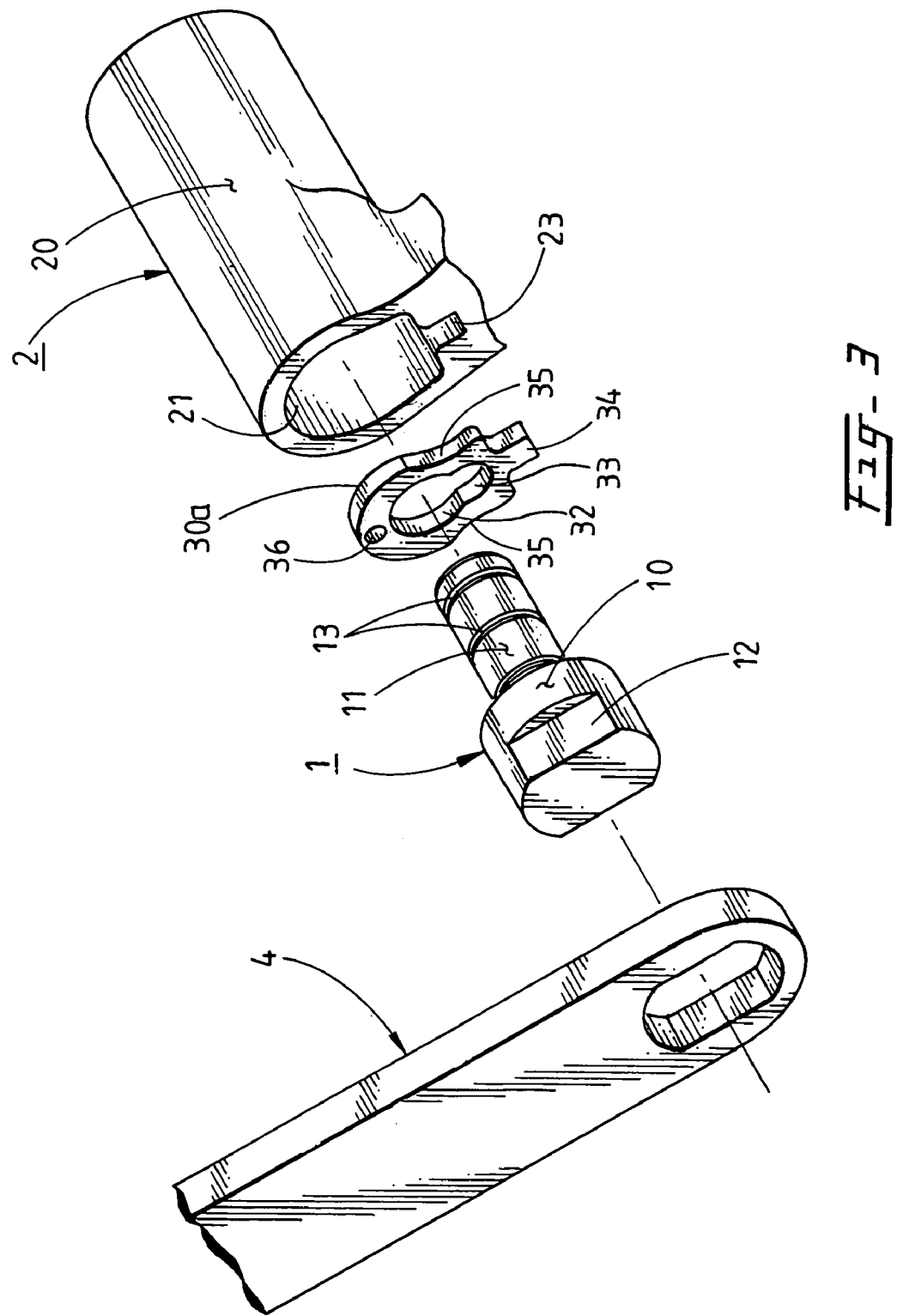

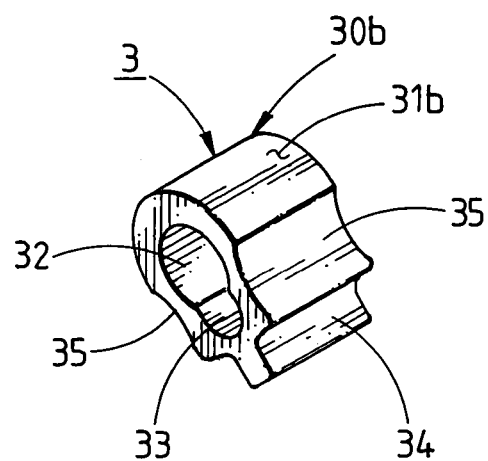
*Fig_4*
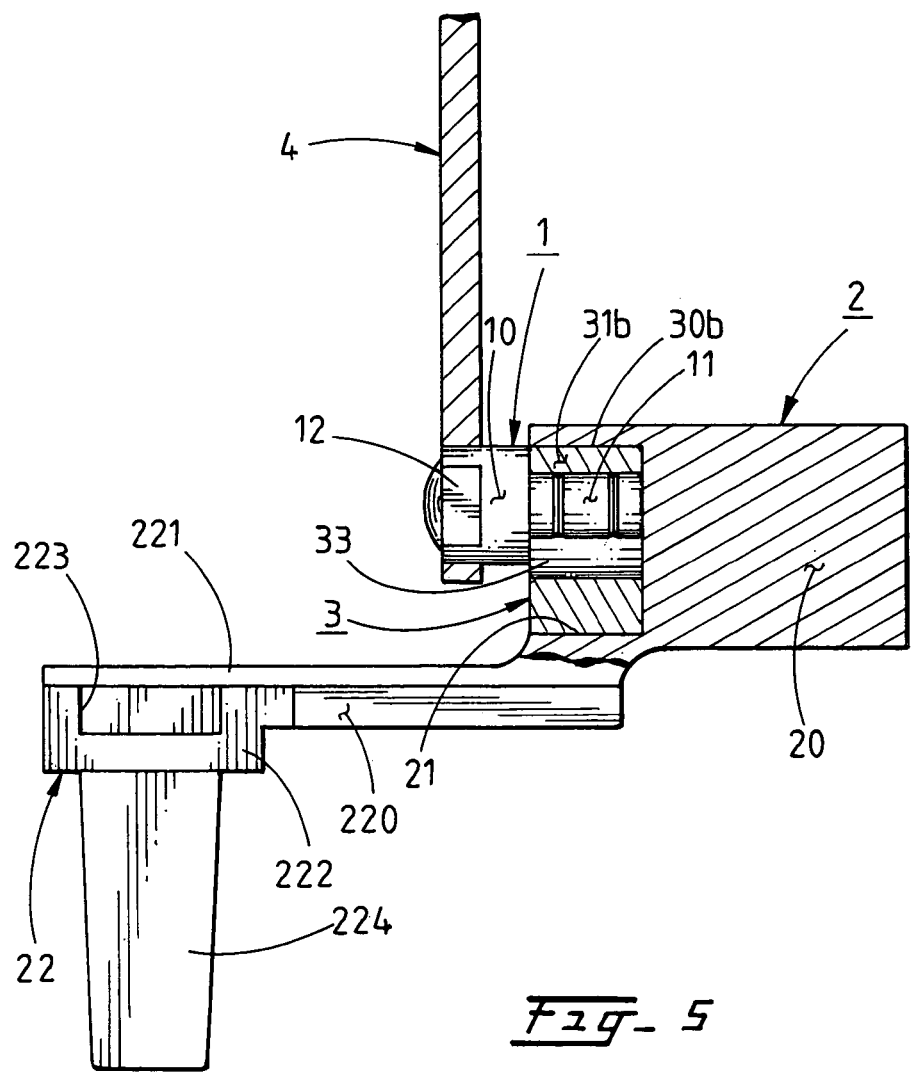
*Fig_5*

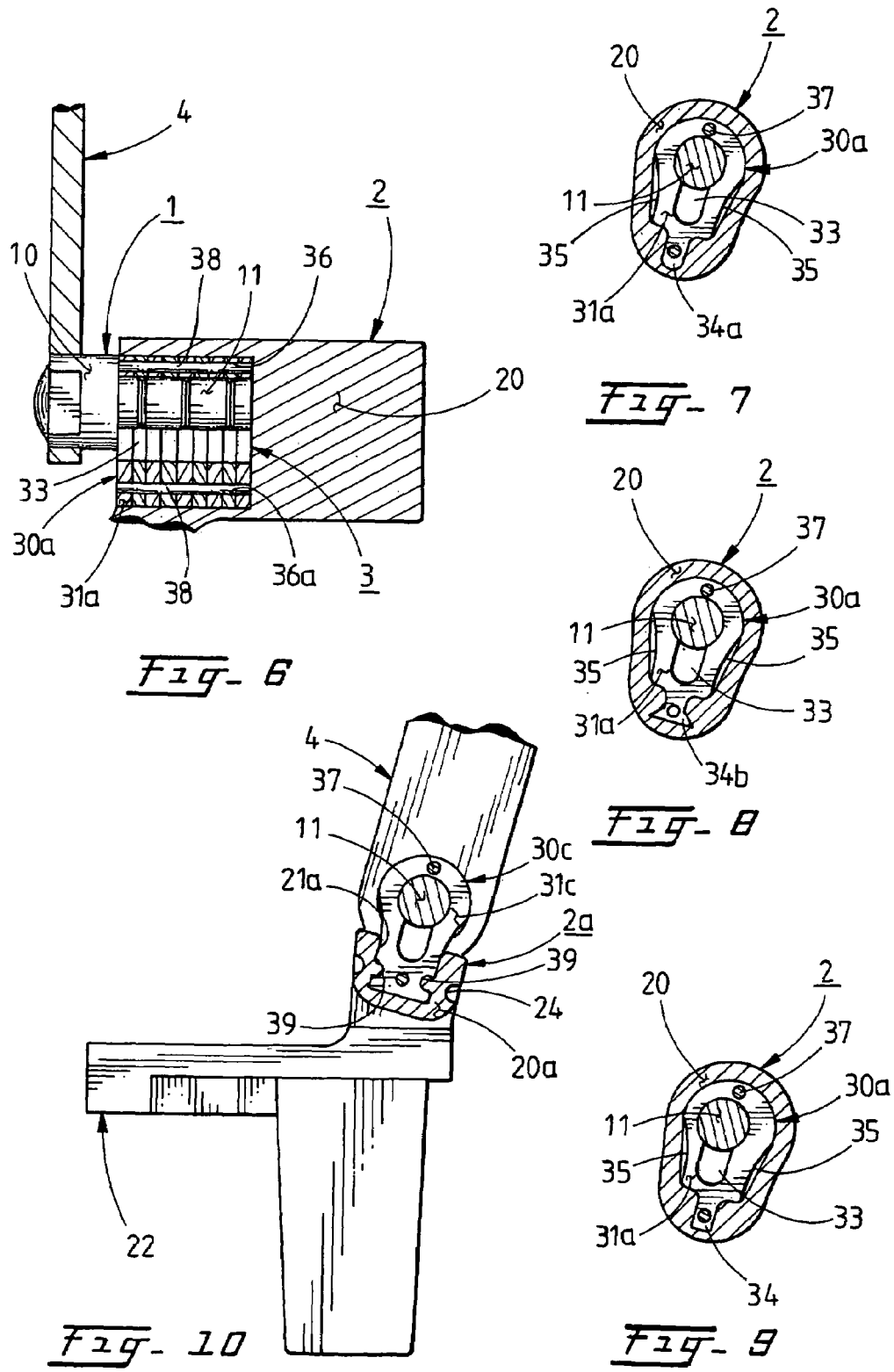

HINGE DEVICE

BACKGROUND OF THE INVENTION

1. Field of the Invention

The invention herein relates to a hinge device having the advantages of simple structure and easy assemblage, and specifically, it is convenient to manufacture a hinge device whose torque differs in the defined condition, wherein a torque of the present invention is relatively bigger depending on the rotational direction or upward/downward movement. When the hinge device is in use, it enables to maintain the same torque since it is quite endurable and hard-wearing, thereby preventing its torque from decreasing after long-term usage. Moreover, the present invention can be fitted with more electric products and it has a sense of excellence for better exterior design.

2. Description of the Prior Art

The present invention is in reference to Taiwan Patent Bulletin Patent No. 092,219,622, which claimed further improvement to the related art.

The prior hinge consists of a revolvable shaft, a fixed plate or bracket and a mounting frame. Its features involve quick assembly, easy installation and also, it is easy to produce a hinge with different values of torque. However, the fixed plate or mounting frame is made of one single board so that the thickness is quite limited. In fact, the torque of the prior hinge is quite small, so it just fits on small-sized apparatus like mobile phones or handheld PDAs. Compared to larger-sized devices such as notebook computers, the said torque is not sufficient for installation and utilization. Furthermore, the externals of the fixed plate or mounting frame installed in the prior hinge do not fit for those of handheld PDAs or similar devices such that dealers in the related business have no favor to manufacture or merchandise the said hinges.

SUMMARY OF THE INVENTION

In view of the described inconvenience and drawbacks, the applicant of the invention herein researched and developed a hinge which has larger value of torque; meanwhile, it's easy to produce a hinge device having different values of torque. The objective of the invention herein is to provide a kind of endurable and hard-wearing hinge device such that a decrease in torque will not occur after being used for a long time. In addition, the present invention can be fitted on more products and it has a sense of excellence for better exterior design.

The hinge device of the present invention includes a rotating shaft, a cylinder and a liner tube. The rotating shaft consists of a joint portion, a shaft portion and an affixing portion. The cylinder contains a cylindrical body, an oval passage therein, a fixing member extending from one side thereof and a positioning groove arranged at one side of the passage. The liner tube comprises two or more pieces of liner portion with a hole therein, and each of the liner portions is combined in alignment; or the liner tube comprises a liner member and a hole therethrough. A notch is disposed at the end of the hole; the shape of the liner tube corresponds to the shape of passage in the cylindrical body and a positioning flange is located at one end of the liner tube so as to engage with the positioning groove of the passage.

A curved portion is formed at both sides of the liner portion body and liner member body respectively such that the liner tube, either in a configuration by aligning at least two liner portions or by means of one liner member, is fixed in the passage of the cylindrical body and then the shaft portion of the rotating shaft is pivotally inserted into the hole of the liner tube so that the assemblage of the present invention is complete. As such, between the curved portion and the cylindrical body is left some space for expansion in the state that the liner portion body or liner member body is not tightly bound with the cylindrical body. When the shaft portion of the rotating shaft inset through the hole of the liner tube turns clockwise or counterclockwise, the rotation of the present invention is made in a smooth manner which further results in hard wear and durability after operation for a long time.

BRIEF DESCRIPTION OF THE DRAWINGS

Preferred embodiments of the present invention will be described with reference to the accompanying drawings so that those skilled in the art can clearly understand the objects and features of the present invention.

FIG. 1 is a vertical-sectional perspective view of the invention herein;

FIG. 2 is a cross-sectional view of the invention on the line 2~2' of FIG. 1;

FIG. 3 is an exploded perspective view of the present invention, wherein the cylinder is displayed only on the part of cylindrical body;

FIG. 4 is an elevation view illustrating another preferred embodiment of the liner tube;

FIG. 5 is a vertical-sectional perspective view illustrating another embodiment of the invention when the liner tube of FIG. 4 is assembled therein;

FIG. 6 is a vertical-sectional perspective view illustrating a liner tube with a pin or more therein;

FIG. 7 and FIG. 8 are cross-sectional view illustrating two different embodiments of positioning flange on the liner tube when compared to the case of FIG. 2;

FIG. 9 is a cross-sectional view illustrating the shaft portion inserted into the hole which is off the central line on the liner portion body; and FIG. 10 is a cross-sectional view illustrating another embodiment of the present invention, wherein a bearing tube is installed with liner segments.

LIST OF NUMERALS AND SYMBOLS

| | | | |
|---|---|---|---|
| 1 | rotating shaft | 20 | cylindrical body |
| 2 | U-shaped cylinder | 20a | bearing tube body |
| 2a | bearing tube | 21 | passage |
| 3 | liner tube | 21a | U-shaped channel |
| 4 | movable rod | 22 | fixing member |
| 10 | joint portion | 23 | positioning groove |
| 11 | shaft portion | 24 | recess |
| 12 | affixing portion | 220 | board body |
| 13 | guiding groove | 221 | first protruding surface |
| 30a | liner portion | 222 | second protruding surface |
| 30b | liner member | 223 | concave portion |
| 30c | liner segment | 224 | raised column |
| 31a | liner portion body | 35 | curved portion |
| 31b | liner member body | 36 | indentation |
| 31c | liner segment body | 36a | opening |
| 32 | hole | 37 | positioning projection |
| 33 | notch | 38 | pin |
| 34 | positioning flange | 39 | semicircular notch |

DETAILED DESCRIPTION OF THE INVENTION

Referring to FIG. 1, FIG. 2 and FIG. 3, the hinge device of the present invention includes a rotating shaft 1, a cylinder 2 and a liner tube 3. Each of the components and the embodiment of the present invention will be described in detail below, as shown in FIG. 3. The rotating shaft 1 consists of a joint portion 10, a shaft portion 11 and an affixing portion 12. Along the outer periphery of the shaft portion 11 is formed at least one guiding groove 13. The cylinder 2 has a cylindrical body 20, an oval passage 21 inside the cylindrical body 20 and a fixing member 22 extending from one side thereof (see FIGS. 1 and 2.) A positioning groove 23 is arranged at the lower end of the passage 21 for pivotal connection with a liner tube 3, as shown in FIG. 2.

The liner tube 3 comprises two or more pieces of liner portion 30a with a hole 32 therein, and each of the liner portions 30a is combined in alignment, as illustrated in FIG. 1; alternatively, the liner tube 3 comprises a liner member 30b and a hole through the liner member body thereof, as shown in FIGS. 4 and 5. A notch 33 is disposed at the end of the hole 32 which serves as a space allowing the shaft portion 11 to expand slightly when the rotating shaft 1 is inserted into the hole 32 of the liner tube 3. Either the shape of liner portion body 31a or that of liner member body 31b corresponds to the shape of passage 21 in the cylindrical body 20; a positioning flange 34 is located at the end of the liner tube 3 so as to engage with the positioning groove 23 of the passage 21 when the liner portion 30a or the liner member 30b is fitted into the passage 21 of the cylindrical body 20.

A curved portion 35 is formed at both sides of the liner portion body 31a and liner member body 31b respectively such that the liner tube 3, either in a configuration by aligning two or more liner portions 30a or by means of one liner member 30b, is fixed in the passage 21 of the cylindrical body 20 and then the shaft portion 11 of the rotating shaft 1 is pivotally inserted into the hole 32 of the liner tube 3 so that the assemblage of the present invention is done. As best shown in FIGS. 1 and 2, the liner portion body 31a or liner member body 31b is embedded in the passage 21; however, between the curved portion 35 and the cylindrical body 20 there is some space left for expansion in the state that the liner portion body 31a or liner member body 31b is not tightly bound with the cylindrical body 20. While the shaft portion 11 of the rotating shaft 1 inset through the hole 32 of the liner tube 3, as illustrated in FIG. 2 and FIG. 5, turns clockwise or counterclockwise, the rotation of the present invention is quite smoothly which further results in hard wear and durability.

The procedure for assembling a hinge device of the present invention, as mentioned above, is rapid and convenient. First, the liner tube 3 constructed by at least two liner portions 30a in aligning manner (see FIG. 1) or by means of one liner member 30b (see FIG. 5), is fixed in the passage 21 inside the cylindrical body 20 of the cylinder 2. Next, the shaft portion 11 of the rotating shaft 1 is pivotally inserted into the hole 32 of the liner tube 3 so the assemblage of the present invention is simply and easily completed.

Hereinafter, the hinge device of the invention is ready to install onto a body or a base of the notebook computer or other similar apparatus (omitted in the drawings.) At first, the fixing member 22 of the cylinder 2 is fixed on a base body of the applicable equipment like notebook computers and then the affixing portion 12 on the rotating shaft 1 is riveted, screwed or fastened with the movable rod 4; or the present invention is directly fitted upon a cover or a top of the notebook computer or other similar apparatus (omitted in the drawings.) Therefore, the installation of the present invention is very convenient and that is ready for use.

In regard to the affixing portion 12 on the rotating shaft 1 of the invention herein, as indicated in FIG. 1, is a flat "O-shaped" body. However, according to diverse merchandise or models and in conformity with various manufacturers' demand, it can be designed for "D-shaped" body, "plane" board body, or threaded shaft body and a hole therein so as to integrate into the cover or the top by engaging, fastening or screwing combination. In order to fit in with the configuration of the hinge mechanism on the base or the bottom of notebook computers or other similar apparatus, the fixing member 22 of the cylinder 2 (see FIGS. 1 and 2) is designed for "trapezoid" board body 220 or other similar geometric board body which extends from one side of the cylindrical body 20. Moreover, in accordance with the corresponding configuration of the hinge mechanism, a first protruding surface 221, a second protruding surface 222, a concave portion 223 and a raised column 224 are formed at the upper or lower end of the board body 220 respectively to facilitate the installation of the hinge mechanism upon the base or the bottom of notebook computer or other similar apparatus. Likewise, in comparison with the above-mentioned affixing portion 12 on the rotating shaft 1, at the opposite end of the passage 21 inside the cylindrical body 20 is disposed a flat "O-shaped" shaft body, a "D-shaped" shaft body, a "plane" board body or a threaded shaft body and a hole therein to enable the fixation onto the base or the bottom thereof.

Additionally, the liner portion body 31a has at least an indentation 36, as shown in FIG. 3, for the convenience of engaging two or more pieces of liner portion 30a in alignment, and a positioning projection 37 corresponding to the indentation 36 is formed on the other side of the liner portion body 31a, as illustrated in FIG. 1, in order to quickly integrate a number of liner portions 30a into one liner tube 3; or referring to FIG. 6, the liner portion body 31a has one opening 36a or more for inserting a pin 38 or more so as to facilitate the integration of liner portions 30a.

A positioning flange 34 is disposed on the liner portion body 31a or the liner member body 31b for the purpose of insetting with the positioning groove 23 in the passage 21 of the cylindrical body 20. The shape of positioning flange 34 can be rectangular, as indicated in FIGS. 2, 3 and 4; also it can be formed as a positioning knob 34a with semicircular flange (see FIG. 7) or a triangular positioning tab 34b (see FIG. 8.) In addition, the positioning flange 34 can be shaped into trapezoid or polygon (omitted in the drawings) on condition that the positioning flange 34 must match with the shape of the positioning groove 23.

Furthermore, a hole 32 in the liner tube 3 of the present invention, by means of several liner portion bodies 31a in alignment or one liner member body 31b, is usually disposed in the "center" and central line of the liner tube 3 such that when the shaft portion 11 of the rotating shaft 1 inset in the liner tube 3 revolves clockwise and counterclockwise or when a user lifts up or lays down the cover of notebook computer or other similar apparatus, the torque of rotation or the torque applied to lift up or lay down a cover remains equivalent. However, as shown in FIG. 9, the hole 32 is off the central line of the liner tube 3 so the torque in clockwise rotation is different from the one in counterclockwise rotation; likewise, the torque applied to lift up a cover is dissimilar to the one applied to lay it down. That is, the torque in clockwise rotation is larger than that in counterclockwise rotation; the torque applied to lift up a cover is larger than that to lay it down and vice versa.

With regard to the cylinder 2 of the invention herein, the cylindrical body 20 is ordinarily formed as a "U-shaped"

cylindrical body with a passage 21 disposed at one end thereof in order to fit with the liner tube 3; alternatively, as illustrated in FIG. 10, a bearing tube 2a is designed for "U-shaped" bearing tube body 20a with a U-shaped channel 21a therein such that each liner segment 30c or a block of liner tube is designed for "oval" segment body or block body, and further, a semicircular notch 39 is disposed at both sides of the liner segment body 31c respectively. The lower end of the liner tube 3, constituted by two or more pieces of liner segment body 31c in alignment, is directly inset with the U-shaped channel 21a in the bearing tube 2a; meanwhile, a recess 24 is punched at two laterals of the bearing tube body 20a. Due to the force of punching both sides of the bearing tube body 20a are pressed inward and then inset with the semicircular notches 39 of the liner segment body 31c respectively, thereby integrating the liner tube 3 into the bearing tube 2a. After that, the shaft portion 11 of the rotating shaft 1 is inserted through the hole 32 in the liner segments 30c so as to complete the assembly of another embodiment of the present invention. Likewise, in the case that the liner tube 3 comprises a block of liner member body 31b, the assembly of another embodiment is completed in the same way; consequently, it's not necessary to describe more details about such assembling procedure.

What is claimed is:

1. A hinge device comprising a rotating shaft, a cylinder and a liner tube, further comprising:

a joint portion having a shaft portion on the one end and an affixing portion on the opposite end;

at least one guiding groove formed along the outer periphery of the shaft portion;

a passage inside a cylindrical body of the cylinder;

a fixing member extending from one side of the cylindrical body;

a positioning groove arranged at the lower end of the passage;

at least two liner portions combined in alignment to form the liner tube or the liner tube having a block of liner member, each of the liner portions defining a liner portion body with a hole therein, the liner portion body corresponding to the shape of the passage, the liner member defining a liner member body with a hole therethrough, the liner member body corresponding to the shape of the passage;

a notch disposed at one end of the hole;

a positioning flange located at the end of the liner portion body or the liner member body so as to engage with the positioning groove of the passage;

two curved portions formed at both sides of the liner portion body or liner member body respectively;

wherein said liner tube is fitted into the passage of the cylindrical body and then the shaft portion of the rotating shaft is pivotally inserted into the hole of said liner portion body or said liner member body, wherein the hinge device further containing:

at least one indentation on said liner portion body; and a positioning projection corresponding to said indentation disposed on the other side of said liner portion body.

* * * * *